United States Patent [19]

Cornell et al.

[11] 4,099,222
[45] Jul. 4, 1978

[54] BICYCLE SAFETY LIGHT

[76] Inventors: James R. Cornell, 79832 Delight Valley School Rd., Cottage Grove, Oreg. 97424; Tommy R. Kirk, 722 N. 71st, Springfield, Oreg. 97477

[21] Appl. No.: 736,747

[22] Filed: Oct. 28, 1976

[51] Int. Cl.² .......................... F21V 33/00; B62J 5/00
[52] U.S. Cl. ................................ 362/72; 340/134; 362/226; 362/389; 362/431
[58] Field of Search ............... 240/7.55, 7.6, 52 R, 240/52.1, 58, 90, 63; 340/119, 134; 362/72, 193, 226, 369, 382, 389, 390, 414, 431

[56] References Cited

U.S. PATENT DOCUMENTS

| | | | |
|---|---|---|---|
| 3,862,410 | 1/1975 | Maxwell | 240/7.55 |
| 3,882,450 | 5/1975 | Janssen | 240/52.1 |
| 3,890,497 | 6/1975 | Rush | 240/7.55 X |
| 3,900,725 | 8/1975 | Komon | 240/52.1 X |
| 4,023,032 | 5/1977 | Taylor | 240/7.55 X |
| 4,027,150 | 5/1977 | Dean | 240/7.55 |

*Primary Examiner*—Fred L. Braun
*Attorney, Agent, or Firm*—James D. Givnan, Jr.

[57] ABSTRACT

A flexible light pole with a light at its tip with the pole removably mounted in a housing which in turn is supported by a contact member engageable with the bicycle fork or frame member. The contact member is apertured for axle engagement and includes an offset marginal portion which seats against the bicycle frame or fork to prevent slippage of the light during bicycle use. The light is attachable at a desired rake angle. An optional light is insertable into the housing.

4 Claims, 9 Drawing Figures

U.S. Patent   July 4, 1978   4,099,222
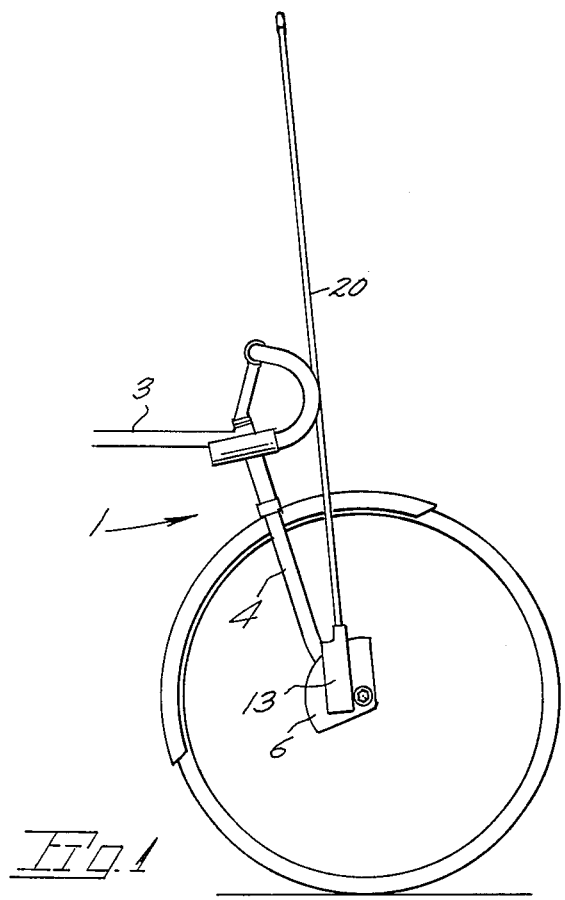
Fig. 1
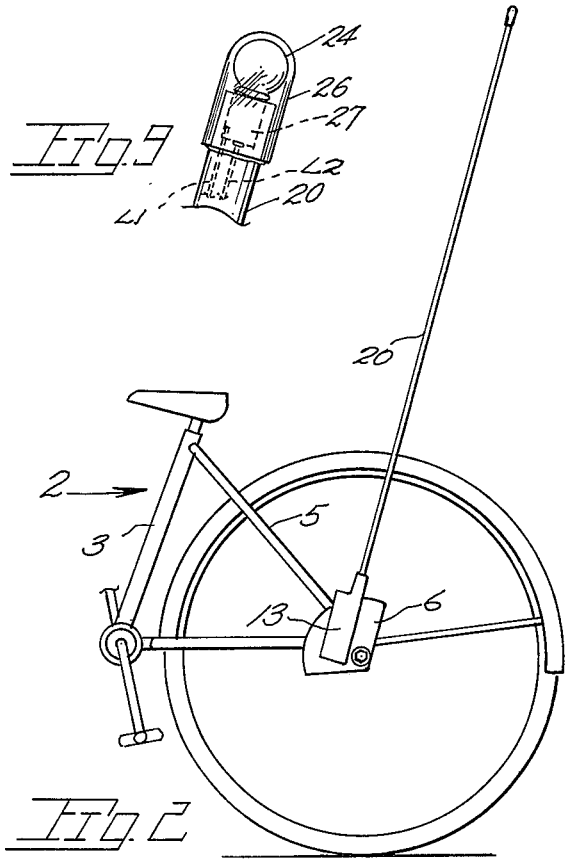
Fig. 2
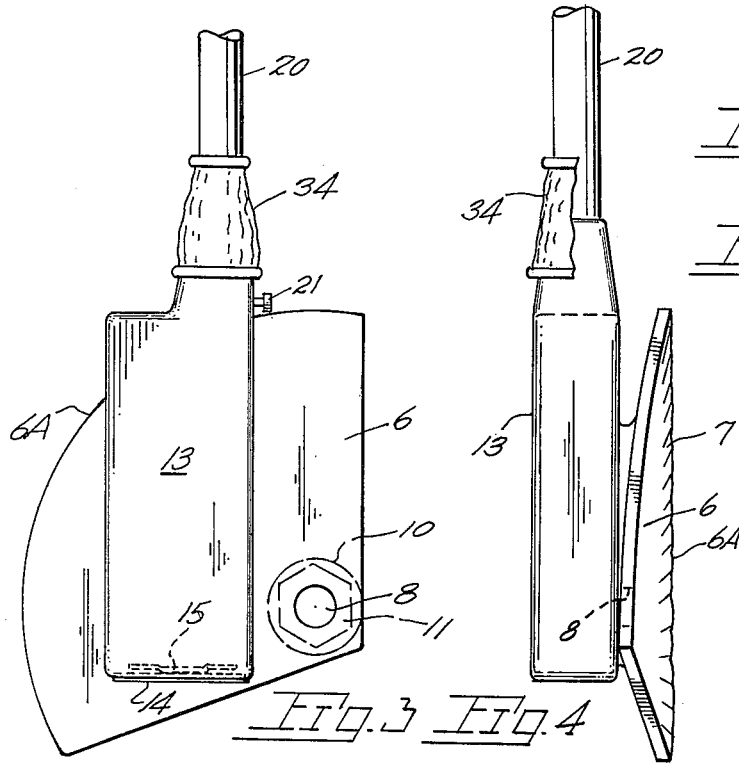
Fig. 3   Fig. 4
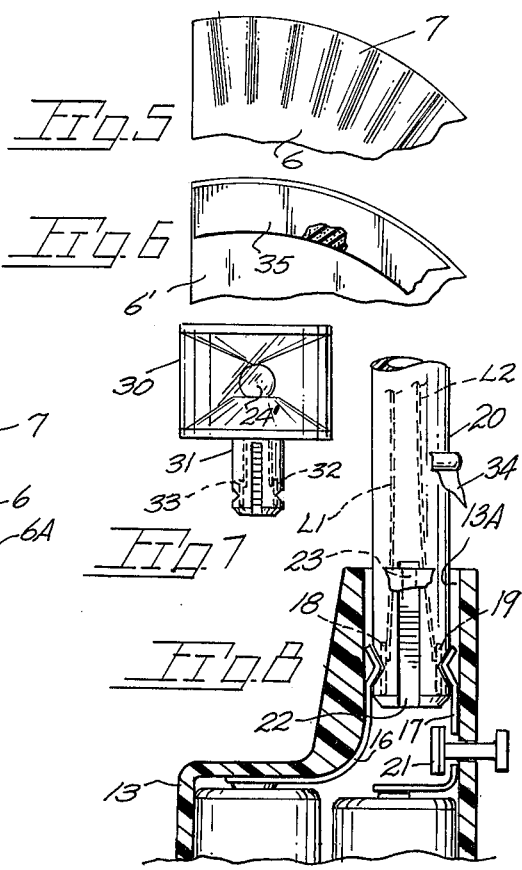
Fig. 5
Fig. 6
Fig. 7
Fig. 8

BICYCLE SAFETY LIGHT

BACKGROUND OF THE INVENTION

The present invention concerns a light for bicycles and particularly a novel mounting arrangement for interchangeable lights.

Well-known in the prior art are various types of lights attachable to the bicycle or the like primarily for safety purposes. Recent improvements in such lights have included the use of flexible, light supporting poles to the upper end of which is affixed a light socket. Such arrangements may include a flexible mount for the light pole. Also found in the prior art are battery housing supporting a light pole and having an opening within which is received the supporting end of a bicycle axle.

While such lighting devices are highly desirable for safety reasons, wide use of same is largely contingent upon their being of low cost, compact and enhancing the appearance of the bicycle. Additionally, to be attractive to the younger set of bicycle operators, it is highly desirable that the light pole be positionable so as to define a rearward rake angle with the bicycle.

SUMMARY OF THE PRESENT INVENTION

The present invention is embodied within a light structure attachable to the front or rear axle of a bicycle and which includes a contact member of biased locking engagement with the bicycle fork or frame. Additionally, a battery housing is integral with said member which housing supports a removably mounted, flexible pole having a light at its upper end.

The lighting device, as aforesaid, is attachable to the front or rear axle of a bicycle and includes a contact member of a size and shape to lockably engage either the frame member or fork of the bicycle in various selected angular relationships to provide a degree of rake for the light pole. The housing may alternatively receive a light located immediately above the housing. The upper end of the housing defines a socket within which are disposed flexible contact arms in circuit with the light bulb and a power source and which arms serve to retain the inserted light pole end against accidental extraction.

Important objects of the present invention include the provision of a bicycle light readily attachable to the front or rear axle and having a contact member for locking contact with said frame or fork of the bicycle throughout a wide range of positions; the provision of a bicycle light attachable to the bicycle to provide a desired rake between the bicycle frame and a light supporting pole to enhance bicycle appearance; the provision of a bicycle light allowing interchangeable use of a light pole and light to provide optional lighting of the bicycle, and; the provision of a bicycle light of durable, low-cost construction not susceptible to damage or accidental displacement during ordinary use of the bicycle.

BRIEF DESCRIPTION OF THE DRAWING

In the drawing:

FIGS. 1 and 2 are side elevational views of the front and rear portions of a bicycle with the present light in place thereon;

FIG. 3 is a side elevational view of the housing and contact member of the present light;

FIG. 4 is a side elevational view of FIG. 3;

FIG. 5 is a fragmentary view of a marginal edge of the contact member;

FIG. 6 is a view similar to FIG. 5 but of an optional contact member;

FIG. 7 is an elevational view on a reduced scale of a light for optional use;

FIG. 8 is a sectional view of the upper end of a housing with fragments broken away for illustrative purposes; and FIG. 9 is an elevational view of the upper end of the light pole.

DETAILED DESCRIPTION OF THE PREFERRED EMBODIMENTS

With continuing attention to the drawing wherein applied reference numerals indicate parts similarly identified in the following description, the reference numeral 1 indicates the frontal portion of a bicycle while 2 indicates the remaining or rear portion thereof. A bicycle frame is indicated at 3 and a front wheel fork at 4 all being conventional tubular structures as is a frame member at 5, known as a seat stay.

For securement to either the front or rear axle per FIGS. 1 and 2, I provide a contact member 6 so termed because it is intended for retentive contact with the bicycle frame or fork as shown. The contact member includes a marginal portion 7 on its bicycle side which has an irregular or undulating surface for engagement with the fork or frame of the bicycle thereby preventing contact member shifting. An opening at 8 in the contact member receives the end of the bicycle axle (front or rear) and thereafter a lock washer and nut 10 and 11.

The contact member shown is of quadrantal shape having an arcuate marginal edge 6A but, of course, could be modified within the scope of the present invention to provide other adequate abutting contact with the frame or fork of the bicycle. Contact member 6 is concavo-convex to offset marginal portion 7 inwardly towards the bicycle with respect to the axle receiving opening 8 of said member.

A housing 13 is supported by said contact member and may receive dry cell batteries to make the present light self-contained. A removable closure plate 14, secured in a suitable manner, includes an electrical bridge 15. In a housing socket at 13A are contact arms 16 and 17 spring biased to engage terminals 18 and 19 carried within the relieved lower end of a flexible light pole 20. Switch means is indicated at 21. Arms 16 and 17 additionally serve to retain light pole 20 in place against all but intentional extraction from socket 13A. For pole alignment purposes, a keyway 22 in the pole receives a projection 23 formed on the socket wall. Light pole electrical leads are indicated at L1 and L2.

In FIG. 9 we show light structure at the end of pole 20 including a bulb 24, a translucent cover 26 with a socket 27. The light structure is for optional use as is a second light structure shown in FIG. 7 at 30 and includes a stem 31 for insertion into socket 13A. Stem 31 is provided with contact plates 32 and 33. Conical surfaces reflect light from an intermediate light bulb 24'.

Housing 13 is shown as being formed integral with contact member 6, both being molded from a high impact type plastic. Alternatively, housing 13 and contact member 6 may be constructed as individual components joined by suitable fastening means. Light pole 20 is desirably of tubular fiber glass.

For purposes of weatherproofing housing 13, a resilient sleeve 34 is provided with elastic end portions for gripping the pole and the socket defining, upper end of the housing.

The contact member 6 may be modified as viewed at 6' in FIG. 6 wherein a resilient strip 35 is provided for bicycle fork or frame engagement.

In use, the safety light may be applied to the fork or rear axle as shown in FIGS. 1 and 2 in a manner avoiding brake and gear change components. Nut element 11 when tightened against contact member, biases same into fork or frame locking engagement to the extent that said contact member is thereafter not susceptible to shifting by reason of the continuous vibration and jars to which a bicycle is subjected. Prior to tightening of nut element 11, contact member 6 and pole 20 are adjusted to provide an attractive degree of rake to said pole. A wide range of pole positions are attainable by reason of the magnitude of marginal area 7.

While we have shown a few embodiments of the invention it will be apparent to those skilled in the art that the invention may be embodied still otherwise without departing from the spirit and scope of the claimed invention.

Having thus described the invention what is desired to be secured under a Letters Patent is:

1. A bicycle safety light for installation on the front or rear axle of a bicycle, said light comprising in combination.
   a contact member supported by the bicycle axle and biased by an axle installed nut,
   a housing supported on said contact member and defining a socket at its upper end,
   a flexible pole having a light at its upper end, and
   said contact member having an offset outer marginal portion including an inwardly offset abutting surface for abutment with a bicycle fork or frame to retain the light pole in a desired rake position against impact loads encountered during bicycle operation.

2. The safety light claimed in claim 1 wherein said contact member is of an arcuate nature and of concavo-convex shape.

3. The safety light claimed in claim 2 wherein the outer marginal portion of the contact member has an irregular surface to assure positive locking engagement with the bicycle.

4. The safety light claimed in claim 1 wherein said housing includes flexible electrical contact arms for biased pole retentive engagement with contacts on the lower end of said light pole, the lower end of said light pole being relieved on opposite sides to permit seating of said arms against said contacts.

* * * * *